(12) United States Patent
Naganna et al.

(10) Patent No.: US 11,573,721 B2
(45) Date of Patent: Feb. 7, 2023

(54) QUALITY-PERFORMANCE OPTIMIZED IDENTIFICATION OF DUPLICATE DATA

(71) Applicant: International Business Machines Corporation, Armonk, NY (US)

(72) Inventors: Soma Shekar Naganna, Bangalore (IN); Abhishek Seth, Deoband (IN); Neeraj Ramkrishna Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 17/357,176

(22) Filed: Jun. 24, 2021

(65) Prior Publication Data

US 2022/0413727 A1     Dec. 29, 2022

(51) Int. Cl.
*G06F 3/06* (2006.01)
*G06F 9/50* (2006.01)

(52) U.S. Cl.
CPC ............ *G06F 3/0641* (2013.01); *G06F 3/067* (2013.01); *G06F 3/0626* (2013.01); *G06F 9/5016* (2013.01); *G06F 9/5072* (2013.01)

(58) Field of Classification Search
CPC ...... G06F 3/0641; G06F 3/0626; G06F 3/067; G06F 9/5016; G06F 9/5072
USPC ........................................................ 711/154
See application file for complete search history.

(56) References Cited

U.S. PATENT DOCUMENTS

| | | | |
|---|---|---|---|
| 2004/0139072 A1* | 7/2004 | Broder | G06F 16/284 |
| 2005/0165782 A1* | 7/2005 | Yamamoto | G06F 16/40 |
| 2016/0357790 A1* | 12/2016 | Elkington | G06F 16/215 |
| 2019/0171655 A1 | 6/2019 | Psota et al. | |

OTHER PUBLICATIONS

Lui Yi et al., "A Method for Entity Resolution in High Dimensional Data Using Ensemble Classifiers", Publication Date Feb. 15, 2017, 12 pages.
Zhun Cheng et al., "A Novel Efficient Feature Dimensionality Reduction Method and Its Application in Engineering", Publication Date Oct. 8, 2018, 15 pages.
Pingfu Chao et al., "Random-based Algorithm for Efficient Entity Matching", Publication Date Sep. 2015, 12 pages.
Noha Adly, "Efficient Record Linkage using a Double Embedding Scheme", Publication Date 2009, 8 pages.

* cited by examiner

*Primary Examiner* — Edward J Dudek, Jr.
*Assistant Examiner* — Sidney Li
(74) *Attorney, Agent, or Firm* — Rakesh Roy; Hunter E. Webb; Keohane & D'Alessandro, PLLC

(57) ABSTRACT

An approach is provided for providing optimized identification of duplicate data in a networked computing environment. An aggregate feature vector is created that is specific to an attribute of the data (e.g., a field that holds specific informational content). The aggregate feature vector has a set of dimensions that each define a specific comparison function used to test for similarity between data entries in the attribute. Each dimension in the aggregate feature vector is assigned an effectiveness, and a cost is computed for each dimension. Based on these two, a subset of dimensions is selected to form an optimized feature vector. This optimized feature vector can then be used to analyze a dataset to find matching data.

20 Claims, 7 Drawing Sheets

QUALITY-PERFORMANCE OPTIMIZED IDENTIFICATION OF DUPLICATE DATA

TECHNICAL FIELD

The present invention relates generally to data management. More specifically, aspects of the present invention provide solutions that create, use, and maintain feature vectors that are optimized for quality and performance in Master Data Management (MDM) based solutions for identifying duplicate data from different sources (e.g., for data deduplication, record linking, etc.) in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

The large scale of resources provided by the network computing environment allows large amounts of data from many different sources to be stored across a large number of physical locations. One way that this large-scale storage can be provided is by providing a hybrid multi-cloud environment. This hybrid multi-cloud environment may have data centers with data clusters at different countries/regions. These data centers may include on-premises data centers owned by the enterprise, private clouds, hosted private clouds and multiple public clouds, which may have data centers at various locations spread around the world, among others.

Managing data on such a large scale can introduce a number of challenges that require special tools for performing data management. Master Data Management (MDM) based solutions can help to meet these challenges by working with enterprise data, performing indexing, matching, and linking of data from different sources, to create a 360 view of customer data, among other things.

One challenge that can be addressed by MDM based solutions is the increasing amount of duplicate data that can arise as the amount of overall data being stored increases. Unidentified duplicate data can reduce the efficiency of a dataset by increasing the amount of storage that is required for data storage and reducing the ability of searches to identify relevant information that may be associated with the duplicate entry.

Because of this, there are currently a number of strategies that have been employed to identify duplicate data entries so that deduplication, linking of the duplicate data entries, and/or other database optimization can be performed. Matching record pair data requires comparing different record attributes (e.g., name, address, date of birth, identifier, etc.) from each pair of records to determine if they match and should subsequently be linked, based on a series of mathematically derived statistical probabilities and complex weight tables. Attribute comparison functions check for a variety of matching conditions like exact, edit distance, NGRAM, phonetic, or partial matching. Scores are generated based on the outcome of these comparisons, and sub scores from each attribute are combined based on statistically determined relative weights. Using statistically defined thresholds within the system, pairs of records can be considered as matched, unmatched, or indeterminant and sent to Clerical Review.

SUMMARY

In general, aspects of the present invention provide an approach for optimized identification of duplicate data in a networked computing environment. An aggregate feature vector is created that is specific to an attribute of the data (e.g., a field that holds specific informational content). The aggregate feature vector has a set of dimensions that each define a specific comparison function used to test for similarity between data entries in the attribute. Each dimension in the aggregate feature vector is assigned an effectiveness, and a cost is computed for each dimension. Based on these two, a subset of dimensions is selected to form an optimized feature vector. This optimized feature vector can then be used to analyze a dataset to find matching data.

A first aspect of the invention provides a method for optimized identification of duplicate data in a networked computing environment, comprising: creating an aggregate feature vector that is specific to an attribute of the data and has a set of dimensions, each dimension defining a specific comparison function used to test for similarity between data entries in the attribute; assigning an effectiveness to each dimension in the aggregate feature vector; computing a cost for each dimension in the aggregate feature vector; selecting a subset of dimensions based on the effectiveness and computed cost of the dimensions to form an optimized feature vector; and analyzing a dataset using the optimized feature vector.

A second aspect of the invention provides a system for optimized identification of duplicate data in a networked computing environment, comprising: a memory medium comprising instructions; a bus coupled to the memory medium; and a processor coupled to the bus that when executing the instructions causes the system to perform a method, comprising: creating an aggregate feature vector that is specific to an attribute of the data and has a set of dimensions, each dimension defining a specific comparison function used to test for similarity between data entries in the attribute; assigning an effectiveness to each dimension in the aggregate feature vector; computing a cost for each dimension in the aggregate feature vector; selecting a subset of dimensions based on the effectiveness and computed cost of the dimensions to form an optimized feature vector; and analyzing a dataset using the optimized feature vector.

A third aspect of the invention provides a computer program product embodied in a computer readable storage medium that implements a method for optimized identification of duplicate data in a networked computing environment, the method comprising: creating an aggregate feature vector that is specific to an attribute of the data and has a set of dimensions, each dimension defining a specific comparison function used to test for similarity between data entries in the attribute; assigning an effectiveness to each dimension in the aggregate feature vector; computing a cost for each dimension in the aggregate feature vector; selecting a subset of dimensions based on the effectiveness and computed cost of the dimensions to form an optimized feature vector; and analyzing a dataset using the optimized feature vector.

Still yet, any of the components of the present invention could be deployed, managed, serviced, etc., by a service provider who offers to store a dataset in a networked computing environment.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
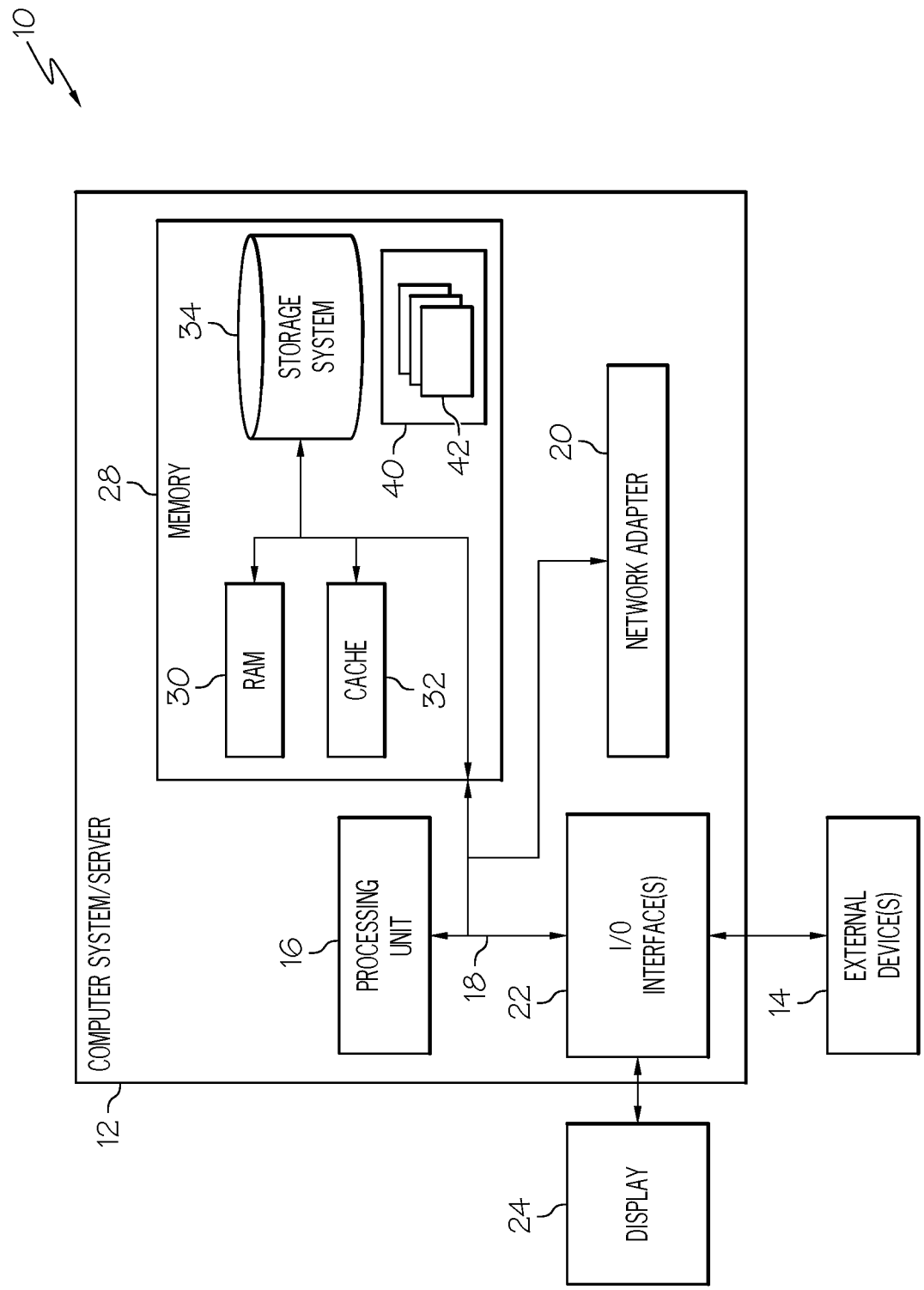
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for optimized identification of duplicate data in a networked computing environment. An aggregate feature vector is created that is specific to an attribute of the data (e.g., a field that holds specific informational content). The aggregate feature vector has a set of dimensions that each define a specific comparison function used to test for similarity between data entries in the attribute. Each dimension in the aggregate feature vector is assigned an effectiveness, and a cost is computed for each dimension. Based on these two, a subset of dimensions is selected to form an optimized feature vector. This optimized feature vector can then be used to analyze a dataset to find matching data.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is illustrated. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radiofrequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
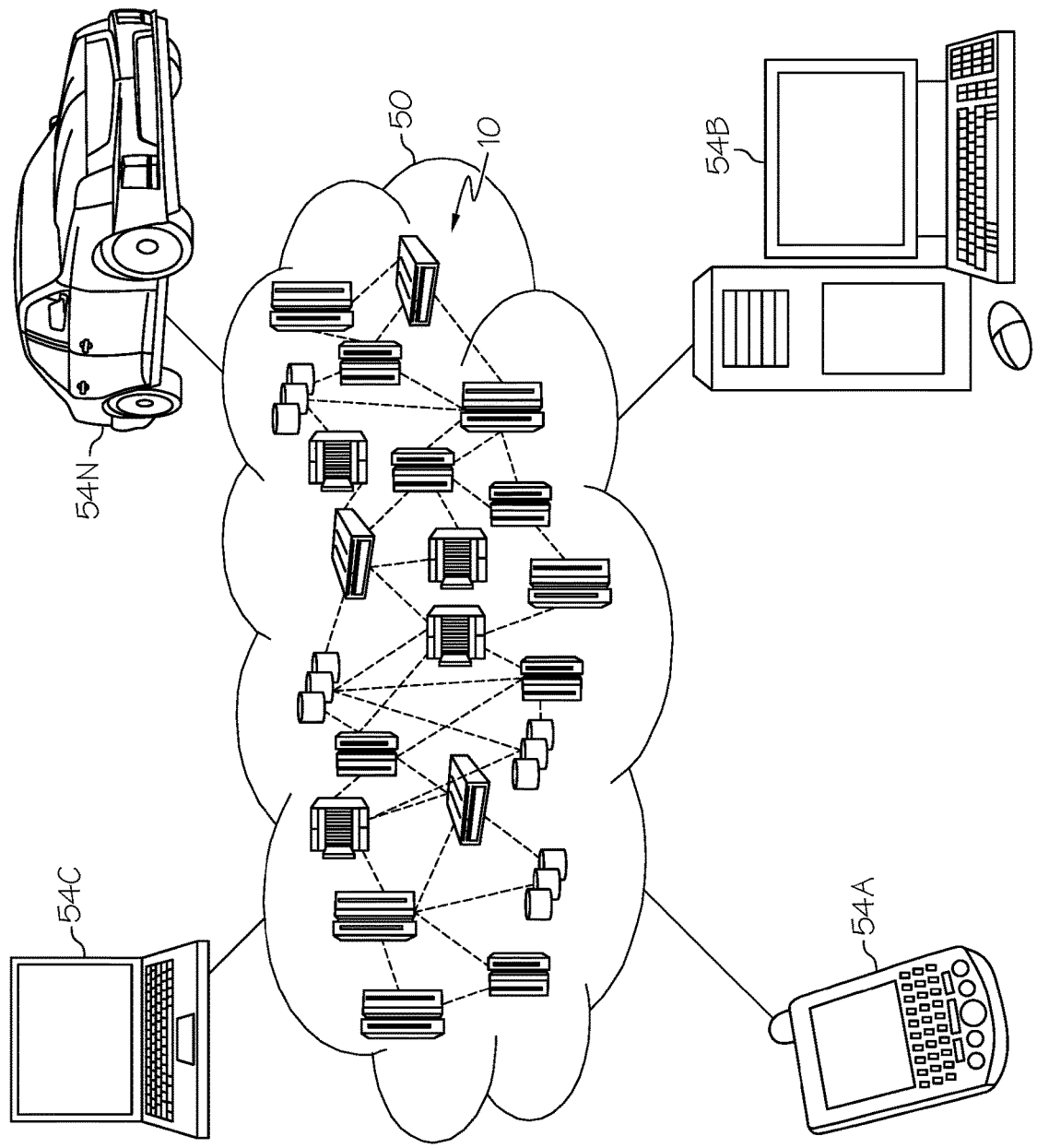
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
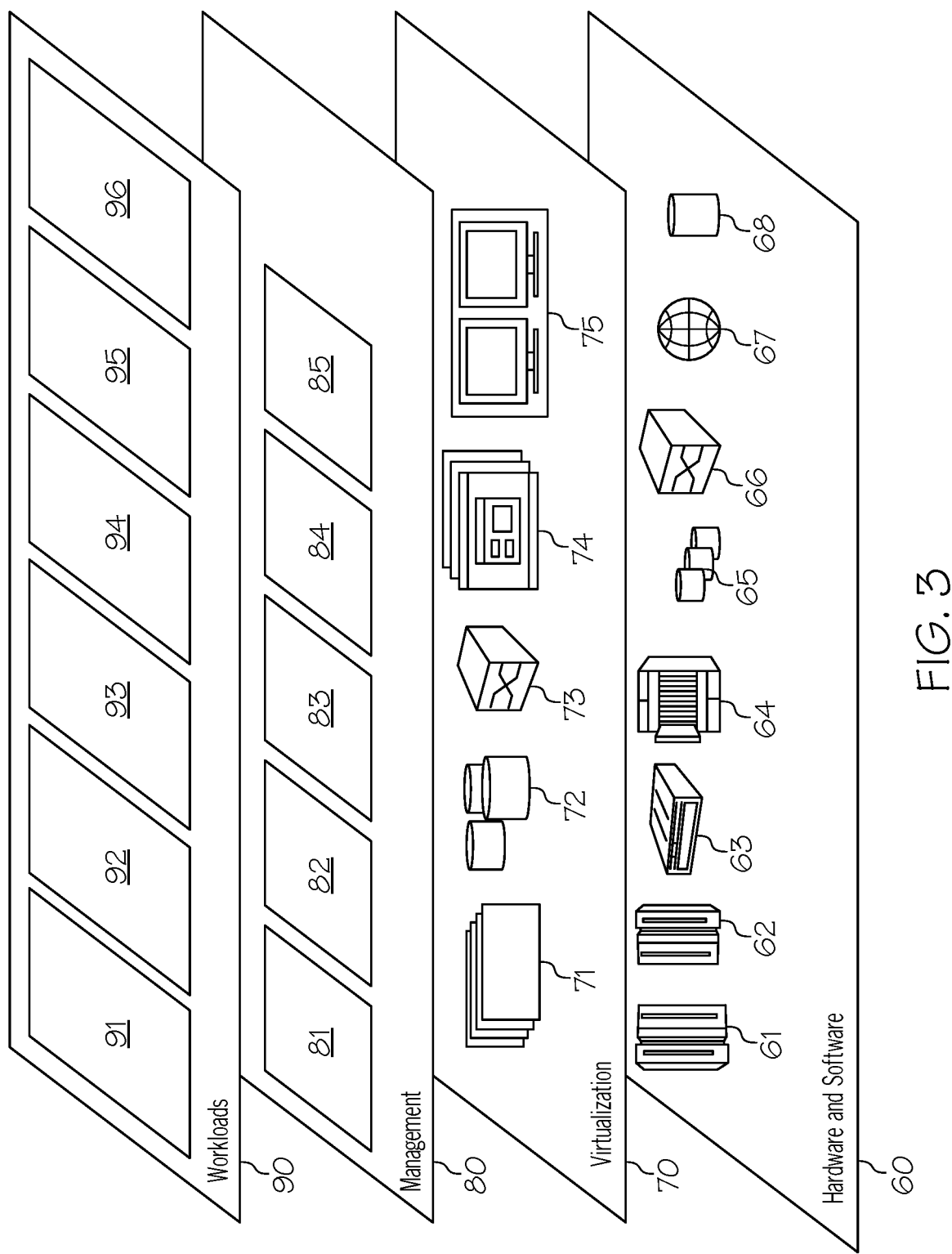
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and duplicate data detection 96. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
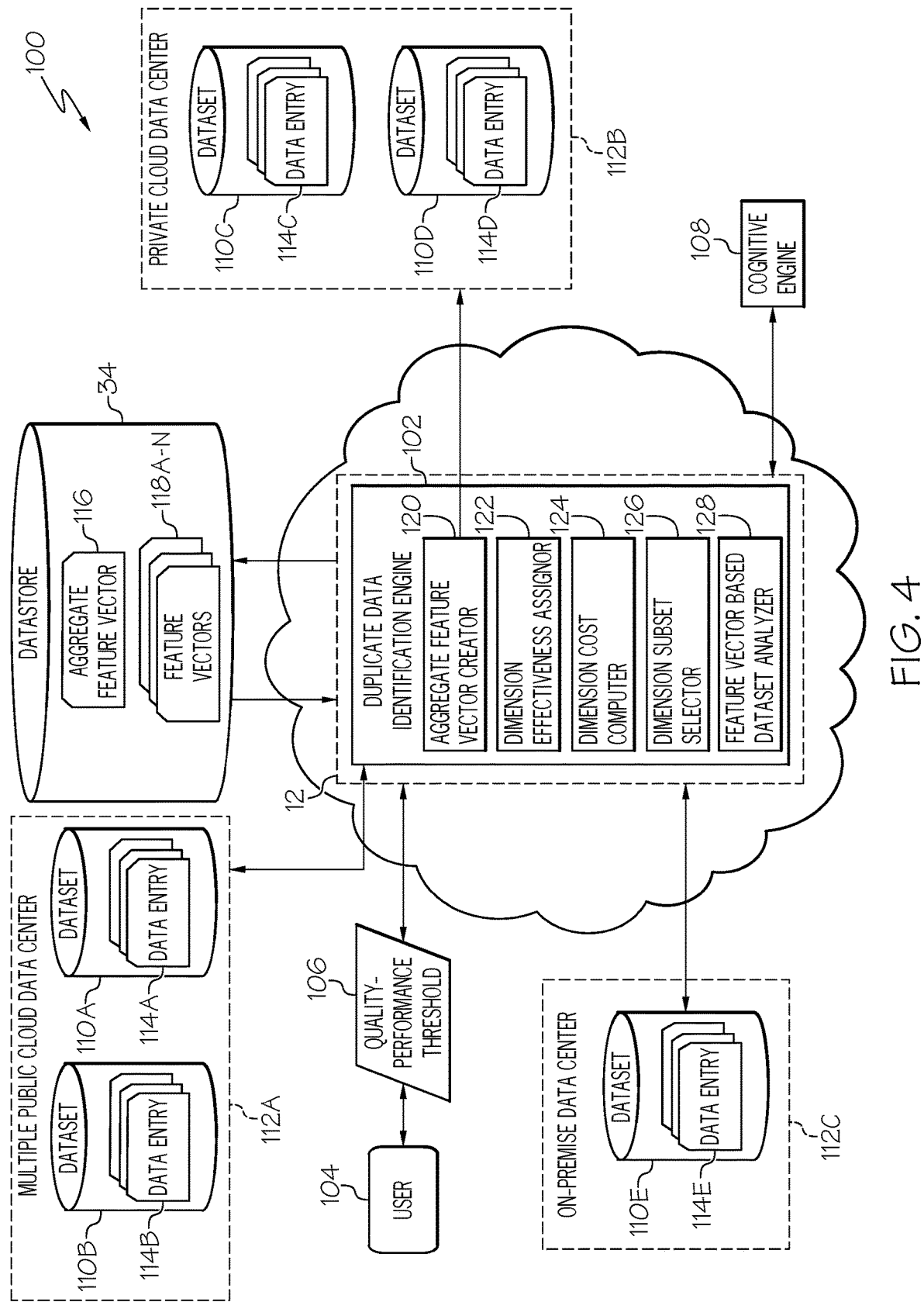
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 100 (e.g., a cloud computing environment). In an embodiment, networked computing environment 100 is an enterprise computing environment. A stand-alone computer system/server 12 is shown in FIG. 4 for illustrative purposes only. In the event the teachings recited herein are practiced in a networked computing environment 100, the physical server associated with each dataset 110N (hereinafter: generically singular 110N, generically plural 110A-N) need not have a duplicate data identification engine (hereinafter "system 102"). Rather, system 102 could be loaded on a server or server-capable device that communicates (e.g., wirelessly) with one or more physical servers associated with datasets 110A-N to provide duplicate data identification therefor. Regardless, as depicted, system 102 is shown within computer system/server 12. In general, system 102 can be implemented as program/utility 40 on computer system 12 of FIG. 1 and can enable the functions recited herein. It is further understood that system 102 may be incorporated within or work in conjunction with any type of system that receives, processes, and/or executes commands with respect to data storage and retrieval in a networked computing environment. Such other system(s) have not been shown in FIG. 4 for brevity purposes. In an embodiment, one or more of the functions these order system(s) and/or any other function of system 102 can be performed by a cognitive engine 108, such as IBM's Watson Search or Watson Explorer (IBM is a registered trademark and Watson is a trademark of International Business Machines Corporation).

System 102 may perform multiple functions. Specifically, among other functions, system 102 can enable user 104 (e.g., a database administrator, or the like) to identify duplicate data contained in one or more data entries 114A-N (hereinafter: generically singular 114N, generically plural 114A-N) within datasets 110A-N in a way that is optimized to the individual data quality and performance requirements that a user 104 of the networked computing environment 100 may have. To accomplish this, system 102 can include: an aggregate feature vector creator 120, a dimension effectiveness assignor 122, a dimension cost computer 124, a dimension subset selector 126, and feature vector-based dataset analyzer 128.

As shown, datasets 110A-N in data centers 112A-N (hereinafter: generically singular 112N, generically plural 112A-N) provide data storage for data entries 114A-N being stored by a number of different users 104. To this extent, data centers 112A-N can provide storage using one of a number of different storage solutions. As shown, data center 112A is a multiple public cloud data center, data center 112B is a private cloud data center, and data center 112C is an on-premise data center. It should be understood that networked data centers of other types are envisioned as well, including, but not limited to, a hosted private cloud.

In any case, because different data entries 114A-N may be added to a single dataset 110N, to multiple datasets 110A-N within a single data center 112N, and/or to multiple datasets within multiple data centers 112A-N by different users 104 and/or at multiple different points in time, it is not uncommon for different data entries 114A-N to contain duplicate data. Duplicate data can be defined as informational content contained as an element (e.g., in a data field) of a plurality of different data entries that have a common meaning while not necessarily being expressed identically. To this extent, an element can be defined as a data group (e.g., a field in a relational database, and/or the like) that contains data having informational content of a common informational type. Thus, multiple different datasets 110A-N are often organized using common elements including, but not limited to: name, gender, official identifier (e.g., social security number, driver's license number, password number, etc.), address, telephone number, date of birth, etc. In an example of duplicate data within an element, suppose that a person has an official name of "Johnathan Smith", but typically goes by the name "John" and has the nicknames "Johnny" and "Junior". Different data entries 114A-N having duplicate data may be created for the same person using the names "Jonathan", "John", "Johnny", and "Junior", and unique data associated with one data entry 114N may not be available to others of the data entries 114A-N because the data in the name element of these data entries is not known to be related. Thus, in order to make data centers 112A-N more efficient, efforts have been made to identify duplicate data found in their respective datasets 110A-N to enable the data entries 114B to be linked, enabling better utilization of information, deduplicated, freeing up wasted space, or otherwise optimized.

Figure 5:
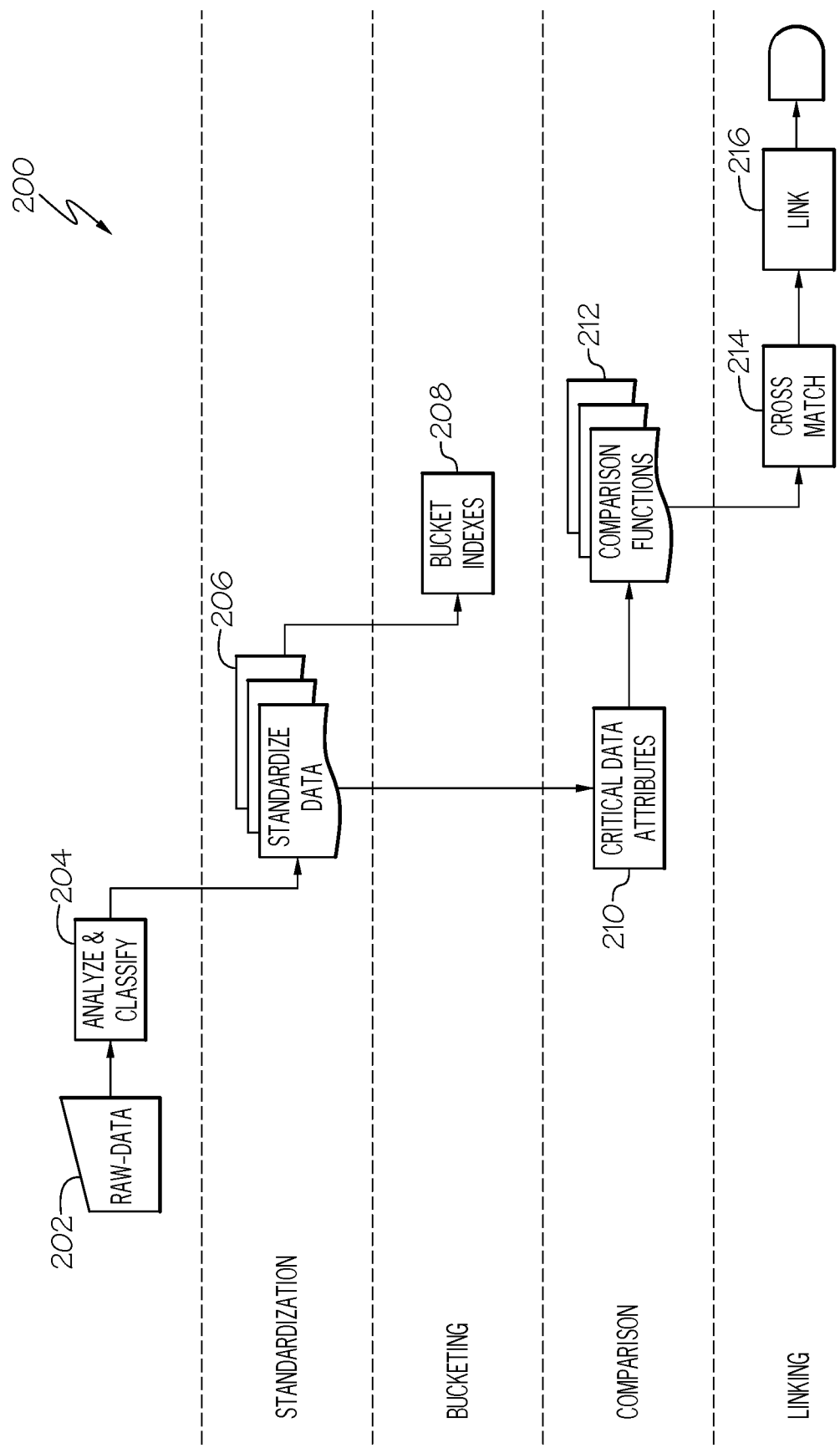
FIG. 5 depicts an example flow diagram of a matching and linking process according to an embodiment of the present invention.
Figure 6:
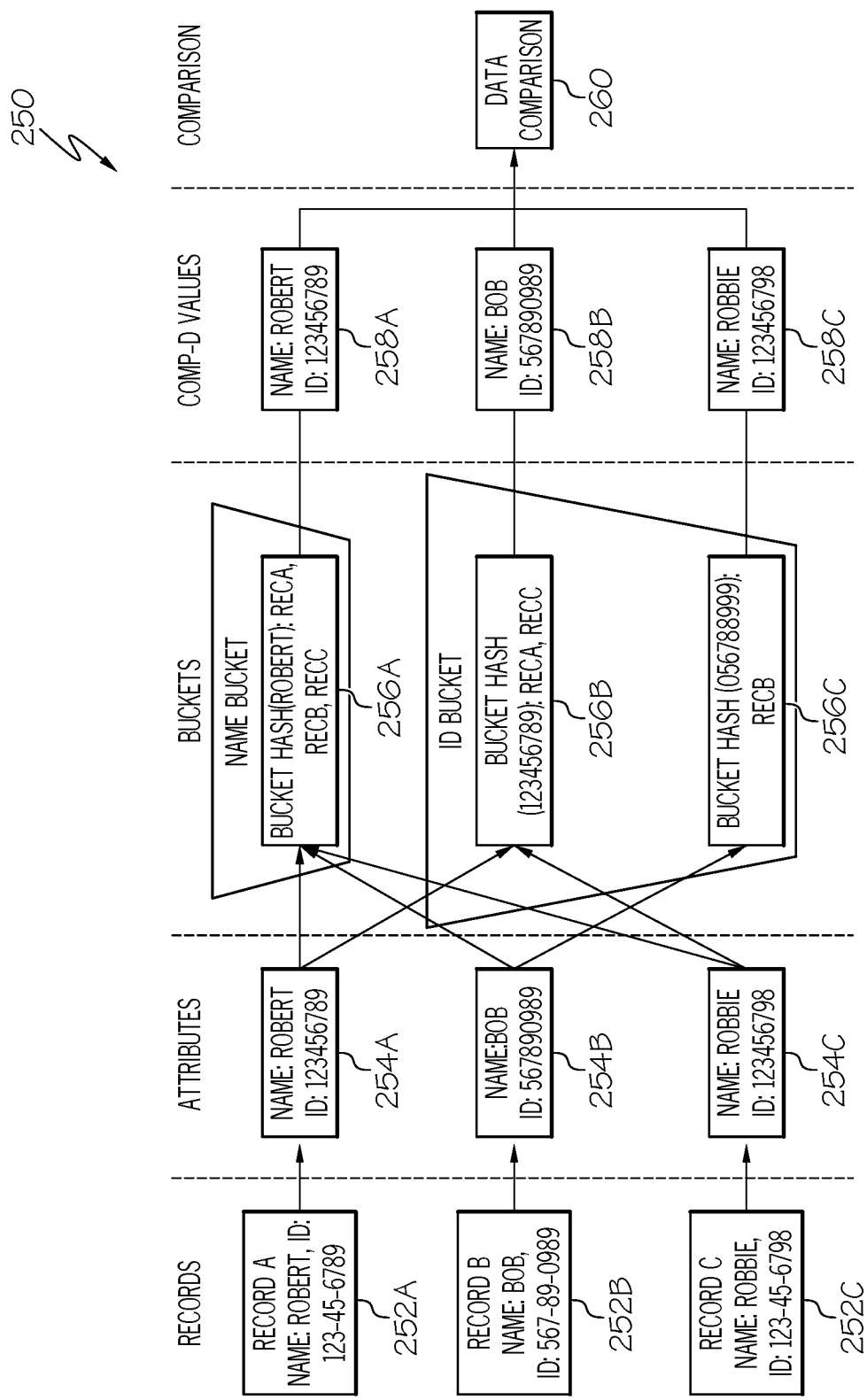
FIG. 6 depicts example flow diagram use case results according to an embodiment of the present invention.

FIGS. 5 and 6 depict an example flow diagram 200 and use case results 250 of example flow diagram 200, respectively, of a matching and linking process according to an embodiment of the present invention. As illustrated, the process begins with the introduction of raw data 202 in the form of a set of records 252A-C. These records are analyzed and classified 204 (e.g., into like elements) and standardized 206 (e.g., by removing punctuation, arranging terms into a common order, etc.) to get a set of attributes 254A-C. Each of these attributes is then indexed 208 into a set of buckets 256A-C so that elements that are determined to have common values are grouped together in the same bucket. Note that the names "Robert", "Bob", and "Robbie" have been identified as being equivalent and have been placed in bucket 256A. Further note that IDs "123456789" and "123456798" have been identified as being equivalent and have been placed in bucket 256B, indicating a determination that the two are within a predetermined degree of closeness (e.g., potentially indicating that a typographical error has been made in the later value). Critical data attributes 210 that are used in matching can be extracted, resulting in a set of comp-D values 258A-C. These can be used to generate a set of comparison functions 212 used to make a data comparison 260, with duplicate records being cross matched 214 and linked 216.

Comparison functions 212 that are used to make data comparison 260 can take a number of different forms. One solution for implementing a set of comparison functions is through the use of a feature vector 118N (hereinafter: generically singular 118N, generically plural 118A-N). A feature vector 118N is a multi-dimensional data structure in which each dimension represents a different comparison function 212 used to determine whether similar elements in different data entries 114A-N are duplicates. For every attribute, the corresponding feature vector 118N is perceived as the representative of the attribute's comparison details. To facilitate making comparisons, the feature vector 118N generally captures a variety of internal comparison details e.g., # of {Exact match, nickname match, phonetic match, edit dist. match etc.}. Since for each attribute, there are different types of similarity checks which are performed, feature vectors 118A-N also carry different details and are of different dimensions. These details and the multidimensional nature of the feature vectors allow them to be used as input to a cognitive engine 108 to get a "distance", which is a measure of how close the attributes of different data entries are. Each feature vector is also generally associated with a score which represents the comparison score from the probabilistic matching engine (e.g., cognitive engine) running with default configurations.

The inventors of the invention described herein have discovered certain deficiencies in the current solutions for identifying duplicate data using features in the current network computing environment. A large vector (e.g., one with a greater number of dimensions) would generally yield a more accurate distance calculation. However, complex attributes (like name) may have a very large number of potential comparison function that can be used as vector elements. Such a large number of vector elements would generally require higher computational and storage resources. Because of this, optimal generation of feature vectors 118A-N is considered to be crucial because the more comparison information that can be captured in a feature vector of optimal size (e.g., a vector with a set of elements which provides the optimal balance of quality and performance), the better the training of the machine learning (e.g., cognitive engine 108) model can occur.

Currently, the process for creating a new feature vector uses reference algorithms that are manually configured by consultants or experienced users. Sample data is compared, and weights are generated through a lengthy statistical analysis process. Randomly selected pairs are generated and reviewed by users. Experienced users or consultants review the responses and manually tune the algorithm configuration, repeating this iterative process until the matching outcomes suggested by the matching engine reflect the preference of user 104 from the pair analysis process. However, this process can be lengthy and very labor intensive. Moreover, the process is inexact, with multiple different feature vectors 118A-N potentially being produced by different experts, reflecting the subjective individual preferences of each expert. Further, the current solutions provide no way to tailor different feature vectors 118A-N based on different objective levels of quality and/or performance that may be required. Additionally, there is currently no way to evaluate a previously created feature vector in an accurate way to determine whether it still meets quality and/or performance requirements and to change the comparison functions 212 contained therein if it does not or if the quality and/or performance requirements have changed.

Certain embodiments of the present invention may offer various technical computing advantages, including a more optimized solution for identifying duplicate data using feature vectors 118A-N that have been optimized for a designated quality-performance threshold 106 that is specific to the environment. These feature vectors 118A-N can improve the functioning of a computer device by enabling duplicate data to be identified and linked, deduplicated, or otherwise optimized, making data center 112A-N data more comprehensive and potentially reducing storage requirements. Further, the feature vectors 118A-N created using the teachings of the claimed invention can be created in less time and using fewer resources that the current solutions and can be continuously updated to ensure that duplicate data identification remains optimized based on the current requirements.

Referring again to FIG. 4, aggregate feature vector creator 120 of system 102, as performed by computer system/server 12, is configured to create an aggregate feature vector 116 that is specific to an attribute of the data. As with other feature vectors 118A-N, aggregate feature vector 116 has a set of dimensions with each dimension defining a specific comparison function used to test for similarity between data entries in the attribute. However, aggregate feature vector 116 is a super set having as dimensions a plurality of potential candidate comparison functions which can be used to test for similarity between data entries in the attribute. In an embodiment, aggregate feature vector can be a comprehensive feature vector that contains all potential candidate comparison functions which could be used to test for similarity between data entries in the attribute.

For example, in a master data management environment, the attributes which play a key role in matching may be as follows: Name, Identifier, Gender, Date, Email, Phone and Address. In this environment, when comparing names, checks may be for exact match, nicknames, phonetic equivalents, edit distance match, generation values etc., for the tokens in two names being compared. Aggregate feature vector 116 for the name attribute may be represented as follows:

$V_{name}$=[#exact matches, #tokens having edit dist<=3, #nickname matches, #disagreement tokens (e.d.>3), #initials match, #left-out tokens, generation code]

In contrast, in identifier (ID) comparison e.g., SSN, Passport No. etc, there may be primarily two things which are evaluated: exact match and edit distance match. As such, aggregate feature vector 116 for the ID attribute may be represented as follows:

$V_{Id}$=[bool(exact match), bool(edit distance match(edit dist<=2), bool(unmatched)]

Similarly, in comparing gender, it can be specified as either being matched or unmatched. As such, aggregate feature vector 116 for the ID attribute may be represented as follows:

$V_{Gender}$=[bool(exact match)].

In date of birth (DOB) comparison, there are a number of things which can be checked e.g., date exactly matches, only year matches, year & month together match, year matches but month & day are transposed, etc. Aggregate feature vector 116 for the DOB attribute may be represented as follows:

$V_{Date}$=[bool(fullDateMatch), bool(onlyYearMatch), bool(YearMonthMatch), bool(MonthDayMatch), bool(isDayMonthTransposed)].

When comparing emailIDs, checks can be made for whether the two emails are exactly the same, partially the same, or different. Aggregate feature vector 116 for the emailID attribute may be represented as follows:

$V_{Email}$=[bool(exact match), bool(edit distance match (edit dist<=3), bool(unmatched (edit dist>3)].

For the address attribute, address and phone can be compared together and their joint effect considered. In doing so, address may consist of street number, city, state, country, and zip code. If zip code is not present, city and street can be compared, otherwise only street number and zip code may be compared. Zip code could be evaluated for exact match and edit distance match, while other tokens could include exact match, phonetic match, nickname match and edit distance match. For phone numbers, exact match and edit distance match could be checked. Considering these factors, aggregate feature vector 116 for the Address and Phone (A1,P1) and (A2,P2) attribute may be represented as follows:

$V_{AXP}$=[bool(isZipPresent), bool(StreetExact), bool(StreetPartial), bool(StreetMismatch), bool(ZipExact), bool(ZipEditDist), bool(ZipMismatch), bool(CityExact), bool(CityPartial), bool(CityMismatch), bool(StateExact), bool(StatePartial), bool(StateMismatch), bool(CountryExact), bool(CountryPartial), bool(CountryMismatch), bool(PhoneExact), bool(PhoneEditDist), bool(PhoneMismatch)].

Although the foregoing examples have been provided for specific attributes in the specific environment of a master data management environment, it should be understood that other environments and other attributes can be envisioned.

In any case, referring again to FIG. 4, dimension effectiveness assignor 122 of system 102, as performed by computer system/server 12, is configured to assign an effectiveness to each dimension in aggregate feature vector 116. To accomplish this, a set of labelled reference data can be generated for the attribute (e.g., using data generator tools). Each generated sample point of the reference data can be a pair of records that contains data only for the attribute for which aggregate feature vector 116 has been created and an associated label (e.g., Boolean) of match vs unmatched for the pair. A set of feature vectors 118A-N that includes a full feature vector 118N for each attribute pair can be calculated for each sample point in the set of reference data. For every sample point, the fully calculated aggregate feature vector is collected, along with its associated truth label, and passed to cognitive engine 108. Cognitive engine 108 evaluates each dimension of the generated set of feature vectors 118A-N (e.g., using logistic regression or the like) to determine a degree to which each dimension is involved in determining matches. After the training, cognitive engine 108 can output the coefficients for each feature vector dimension. The coefficients represent the dimension's importance (I) in matching by quantifying the degree to which the dimension is involved in determining the matches. This coefficient can be assigned to the dimension as its effectiveness.

Dimension cost computer 124 of system 102, as performed by computer system/server 12, is configured to compute a cost for each dimension in aggregate feature vector 116. For example, as the full feature vector 118N is calculated for each attribute pair for each sample point in the set of reference data, the cost (C) of each dimension of the feature vector 118N can be calculated and stored. This cost can include a combination of the computation time and storage for each of the vector elements, such that total cost C=at+bs (where t is time, s is storage, and a and b are constants). This time cost can be aggregated (e.g., as an average) across all attribute pairs to obtain the cost for each dimension.

Dimension subset selector 126 of system 102, as performed by computer system/server 12, is configured to select a subset of dimensions based on the effectiveness and computed cost of the dimensions to form an optimized feature vector 118N. To accomplish this, a quality-performance threshold 106 is obtained. This quality-performance threshold 106 can be obtained using modules that are customized and hence based on user's 104 input (e.g., by gathering the input from user 104 using a graphical user interface. Alternatively, in cases in which user 104 input is not desired or otherwise unavailable, default values could be used. For example, default values could be defined as follows: If I>=0.5, choose that element. If I<0.5 but I/C>=0.5, choose that different element. In any case, quality-performance threshold 106 is based on at least one of a performance requirement or a correctness requirement. Cognitive engine 108 can be fed with the importance and cost (I,C) of each element of the feature vector 118N. Elements in aggregate feature vector 116 that have the lowest function of effectiveness are removed from aggregate feature vector 116 until the quality-performance threshold 106 is met. In an embodiment, the (I,C) function could be or could include a simple ratio or weighted ratio (e.g., a I/b C). In other embodiments, the (I,C) function could be an exponentially weighted ratio (e.g., $I^a/C^b$, where a and b both are between 0 and 1). In addition, elements that have an effectiveness that exceeds a predetermined effectiveness threshold and/or that have a cost that is below a predetermined cost threshold may be retained (e.g., reintroduced). The elements that remain after the removing and reintroducing are selected at the subset of dimensions in the optimized feature vector.

Feature vector-based dataset analyzer 128 of system 102, as performed by computer system/server 12, is configured to analyze a dataset using the optimized feature vector. To accomplish this, the optimized feature vector can be included in the comparison functions 212 used to perform the data comparison in the matching and linking process discussed earlier in conjunction with FIGS. 5-6. In addition, results from the use of the optimized feature vector (e.g., in a production environment) can be used to further optimize the optimized feature vector and/or to adapt the optimized feature vector to updated requirements. To accomplish this, feedback regarding previous decisions made using optimized feature vector could be provided to cognitive engine 108 (e.g., in the form of tagged data). This feedback could include cases that were correctly decided using optimized feature vector as well as cases that were incorrectly identified as matches (false positives), duplicate data that was not correctly identified, and/or cases for which an inconclusive determination was arrived at. Cognitive engine 108 can then generate a new set of aggregate feature vector-based feature vectors 118A-N using the data for which feedback has been provided. This new set of feature vectors 118A-N can then be analyzed by cognitive engine 108 and a new subset of dimensions can be selected based on the new effectiveness and computed cost of the dimensions, forming a new more precisely optimized feature vector.

Moreover, the teachings included herein provide the ability to easily modify an optimized feature vector in response to changing requirements. For example, suppose that user 104 wants the effectiveness of the matching to increase (e.g., from 95% to 98%). Alternatively, assume that user 104 wants the cost of performing the matching to decrease (e.g., by 5%). Feature vectors 118A-N can be recreated using the tagged in conjunction with using aggregate feature vector 116 and/or previously created feature vectors 118A-N that are based on aggregate feature vector 116 can be retrieved. These aggregate feature vector-based feature vectors 118A-N can be inputted to cognitive engine 108, and cognitive engine 108 can select dimensions for a newly modified optimum feature vector based on a new quality-performance threshold 106.

Figure 7:
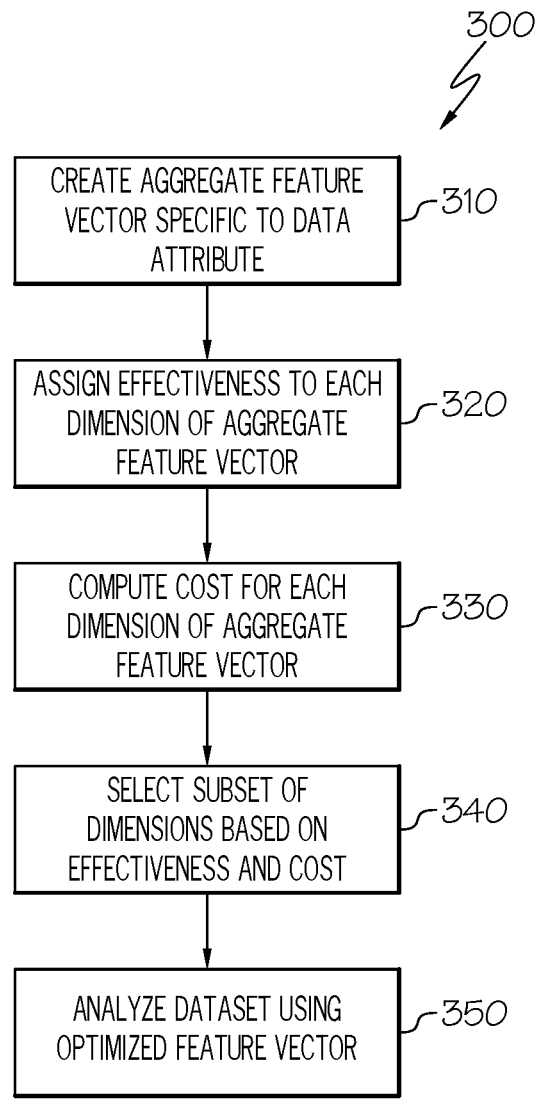
FIG. 7 depicts an example process flowchart according to an embodiment of the present invention.

Referring now to FIG. 7, in conjunction with FIG. 4, a process flowchart 300 according to an embodiment of the present invention is shown. At 310, aggregate feature vector creator 120 of system 102, as performed by computer system/server 12, creates a comprehensive feature specific to a data attribute. This aggregate feature vector 116 contains a set of dimensions, with each dimension defining a specific comparison function used to test for similarity between data entries in the attribute. At 320, dimension effectiveness assignor 122 of system 102, as performed by computer system/server 12, assigns an effectiveness to each dimension in the aggregate feature vector 116. At 330, dimension cost computer 124 of system 102, as performed by computer system/server 12, computes a cost for each dimension in the aggregate feature vector 116. At 340, dimension subset selector 126 of system 102, as performed by computer system/server 12, selects a subset of dimensions based on the effectiveness and computed cost of the dimensions to form an optimized feature vector. At 350, feature vector-based dataset analyzer 128 of system 102, as performed by computer system/server 12, analyzes a dataset 110N using the optimized feature vector.

The process flowchart of FIG. 7 and block diagrams of the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While shown and described herein as an approach for optimized identification of duplicate data in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for optimized identification of duplicate data in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for optimized identification of duplicate data in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices and disparate memory devices.

Furthermore, systems/units may also be implemented as a combination of software and one or more hardware devices. For instance, system 102 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed by the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for optimized identification of duplicate data in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimized identification of duplicate data in a networked computing environment, comprising:
    creating an aggregate feature vector that is specific to an attribute of the data and has a set of dimensions, each dimension defining a specific comparison function used to test for similarity between data entries in the attribute;
    assigning an effectiveness to each dimension in the aggregate feature vector;
    computing a cost for each dimension in the aggregate feature vector;
    selecting a subset of dimensions based on the effectiveness and computed cost of the dimensions to form an optimized feature vector; and
    analyzing a dataset using the optimized feature vector.

2. The method of claim 1, wherein the aggregate feature vector is a super set having as dimensions a plurality of potential candidate comparison functions which could be used to test for similarity between data entries in the attribute.

3. The method of claim 1, further comprising:
    calculating a set of a feature vectors that includes a feature vector for each attribute pair in a set of reference data using the aggregate feature vector;
    calculating a time cost required to perform a portion of the calculating of the feature vector corresponding to each dimension in the aggregate feature vector; and
    aggregating the time cost across all attribute pairs to obtain the cost for each dimension.

4. The method of claim 3, further comprising:
    analyzing the set of feature vectors based on a set of known results using a cognitive engine to determine a degree to which each dimension is involved in determining matches;
    generating a coefficient for each dimension that quantifies the degree to which the dimension is involved in determining the matches; and
    assigning the coefficient to the dimension as the effectiveness.

5. The method of claim 1, the selecting further comprising:
    obtaining a quality-performance threshold based on at least one of a performance requirement or a correctness requirement;
    removing elements from the aggregate feature vector that have a lowest function of effectiveness to cost until the quality-performance threshold is met; and
    selecting remaining elements as the subset of dimensions.

6. The method of claim 5, the selecting further comprising reintroducing an element that has an effectiveness that exceeds an effectiveness threshold.

7. The method of claim 1, wherein the networked computing environment is a cloud computing environment.

8. A system for optimized identification of duplicate data in a networked computing environment, comprising:
a memory medium comprising instructions;
a bus coupled to the memory medium; and
a processor coupled to the bus that when executing the instructions causes the system to perform a method, comprising:
creating an aggregate feature vector that is specific to an attribute of the data and has a set of dimensions, each dimension defining a specific comparison function used to test for similarity between data entries in the attribute;
assigning an effectiveness to each dimension in the aggregate feature vector;
computing a cost for each dimension in the aggregate feature vector;
selecting a subset of dimensions based on the effectiveness and computed cost of the dimensions to form an optimized feature vector; and
analyzing a dataset using the optimized feature vector.

9. The system of claim 8, wherein the aggregate feature vector is a super set having as dimensions a plurality of potential candidate comparison functions which could be used to test for similarity between data entries in the attribute.

10. The system of claim 8, the method further comprising:
calculating a set of a feature vectors that includes a feature vector for each attribute pair in a set of reference data using the aggregate feature vector;
calculating a time cost required to perform a portion of the calculating of the feature vector corresponding to each dimension in the aggregate feature vector; and
aggregating the time cost across all attribute pairs to obtain the cost for each dimension.

11. The system of claim 10, the method further comprising:
analyzing the set of feature vectors based on a set of known results using a cognitive engine to determine a degree to which each dimension is involved in determining matches;
generating a coefficient for each dimension that quantifies the degree to which the dimension is involved in determining the matches; and
assigning the coefficient to the dimension as the effectiveness.

12. The system of claim 8, the method further comprising:
obtaining a quality-performance threshold based on at least one of a performance requirement or a correctness requirement;
removing elements from the aggregate feature vector that have a lowest function of effectiveness to cost until the quality-performance threshold is met; and
selecting remaining elements as the subset of dimensions.

13. The system of claim 12, the selecting further comprising reintroducing an element that has an effectiveness that exceeds an effectiveness threshold.

14. The system of claim 8, wherein the networked computing environment is a cloud computing environment.

15. A computer program product embodied in a computer readable storage medium that implements a method for optimized identification of duplicate data in a networked computing environment, the method comprising:
creating an aggregate feature vector that is specific to an attribute of the data and has a set of dimensions, each dimension defining a specific comparison function used to test for similarity between data entries in the attribute;
assigning an effectiveness to each dimension in the aggregate feature vector;
computing a cost for each dimension in the aggregate feature vector;
selecting a subset of dimensions based on the effectiveness and computed cost of the dimensions to form an optimized feature vector; and
analyzing a dataset using the optimized feature vector.

16. The computer program product of claim 15, wherein the aggregate feature vector is a super set having as dimensions a plurality of potential candidate comparison functions which could be used to test for similarity between data entries in the attribute.

17. The computer program product of claim 15, the method further comprising:
calculating a set of a feature vectors that includes a feature vector for each attribute pair in a set of reference data using the aggregate feature vector;
calculating a time cost required to perform a portion of the calculating of the feature vector corresponding to each dimension in the aggregate feature vector; and
aggregating the time cost across all attribute pairs to obtain the cost for each dimension.

18. The computer program product of claim 17, the method further comprising:
analyzing the set of feature vectors based on a set of known results using a cognitive engine to determine a degree to which each dimension is involved in determining matches;
generating a coefficient for each dimension that quantifies the degree to which the dimension is involved in determining the matches; and
assigning the coefficient to the dimension as the effectiveness.

19. The computer program product of claim 18, the selecting further comprising:
obtaining a quality-performance threshold based on at least one of a performance requirement or a correctness requirement;
removing elements from the aggregate feature vector that have a lowest function of effectiveness to cost until the quality-performance threshold is met; and
selecting remaining elements as the subset of dimensions.

20. The computer program product of claim 15, the selecting further comprising reintroducing an element that has an effectiveness that exceeds an effectiveness threshold.

* * * * *